(12) United States Patent
Sen et al.

(10) Patent No.: US 6,208,620 B1
(45) Date of Patent: Mar. 27, 2001

(54) TCP-AWARE AGENT SUBLAYER (TAS) FOR ROBUST TCP OVER WIRELESS

(75) Inventors: Sanjoy Sen, Plano, TX (US); Atul Suresh Joshi, Maharashtra (IN); Apurva Kumar, Lucknow (IN); M. N. Umesh, Kerela (IN)

(73) Assignee: Nortel Networks Corporation, Montreal (CA)

( * ) Notice: Subject to any disclaimer, the term of this patent is extended or adjusted under 35 U.S.C. 154(b) by 0 days.

(21) Appl. No.: 09/365,443

(22) Filed: Aug. 2, 1999

(51) Int. Cl.[7] ................................. H04J 3/16; H04J 3/22; H04J 1/16; H04J 3/14; H04L 1/00
(52) U.S. Cl. ......................... 370/231; 370/469; 370/310
(58) Field of Search ..................................... 370/231, 235, 370/236, 237, 252, 242, 394, 229, 428, 310, 328, 466, 469; 714/748, 749; 455/414, 422, 466, 556, 557, 504, 506

(56) References Cited

U.S. PATENT DOCUMENTS

| | | | |
|---|---|---|---|
| 4,527,267 | * 7/1985 | Cohen | 370/231 |
| 5,245,616 | * 9/1993 | Olson | 714/748 |
| 5,337,313 | * 8/1994 | Buchholz et al. | 370/394 |
| 5,444,718 | * 8/1995 | Ejzak et al. | 714/748 |
| 5,553,075 | * 9/1996 | Westin | 370/349 |
| 5,701,302 | * 12/1997 | Geiger | 370/521 |

* cited by examiner

*Primary Examiner*—David R. Vincent
(74) *Attorney, Agent, or Firm*—John D. Crane; Flesman, Bradley, Vaden, Gunter & Dillon, LLP

(57) ABSTRACT

Disclosed is a system for minimizing the effects of faults over an air link of a wireless transmission channel utilizing Transport Control Protocol (TCP). The system includes a TCP-Aware Agent Sublayer (TAS) in a protocol stack, which has a mechanism for caching both TCP packets during forward transmission and acknowledgment (ACK) return packets. The caching mechanism is located near a wireless link of the wireless transmission channel. The system also includes a link monitoring agent coupled to the TAS. The link monitoring agent monitors the condition of the wireless transmission channel for an occurrence of a predefined fault. Once a predefined fault is detected, a system response is implemented based on the type of fault encountered. When the fault is an air link packet loss, an associated packet is immediately retransmitted from the cache, and when the fault is a temporary disconnect, a congestion window of the TCP source is closed.

16 Claims, 4 Drawing Sheets

TCP-AWARE AGENT SUBLAYER (TAS) FOR ROBUST TCP OVER WIRELESS

BACKGROUND OF THE INVENTION

1. Technical Field

The present invention relates in general to electronic communications systems, and in particular to a method and system for implementing control mechanisms to enhance Transport Control Protocol (TCP) performance. Still more particularly, the present invention relates to a method and system for implementing robust TCP performance over wireless links utilizing a TCP-Aware Agent Sublayer (TAS).

2. Description of the Related Art

Transport Control Protocol (TCP) is a "layer 4" protocol utilized in various wire and wireless transport paths as the means for enabling transmission of data, voice, telephony, Internet Protocol (IP), etc. TCP provides end-to-end session control between two hosts. It is connection-oriented, i.e. it requires a session to be established before data can be exchanged. TCP also provides error detection and correction for applications requiring connection-oriented services. As with other connection-oriented protocols, once the session is established between two logical entities, the receiving host must acknowledge all received data units. If a data unit is not acknowledged, there are no error messages (negative acknowledgments (NAK)) sent by TCP. Instead, the sending host sets a timer, and if no positive acknowledgment (ACK) is received before the expiration of the timer, then the data unit is automatically retransmitted. The timer is a variable one based on round-trip time. TCP utilizes both ACKs and windowing for flow control. Fields for the ACK number and window size are found within the TCP header which is attached to the respective data. TCP allows the host to adjust its window based on resources available, as well as buffer size.

TCP is designed to perform well over traditional low-loss wire-line networks. Designers of TCP integrated a robust window-based flow control mechanism with the traditional Automatic Request for Retransmission (ARQ), to help a network gracefully recover from packet losses due to network congestion, without aggravating the congestion during the recovery process. TCP, however, attributes all types of packet loss, both wired and wireless, to network congestion and enters the congestion control mode even though the loss may be due to other reasons such as a fading wireless access link. This causes the TCP throughput to degrade unnecessarily.

Link layer ARQ mechanisms have been suggested to shield TCP from the vagaries of the radio link. Various Radio Link Protocol (RLP) including IS-707 or Third Generation (3G) Phase I (currently, under development) or General Packet Radio Service (GPRS) Radio Link Control (RLC) proposes to reduce this problem by splitting a TCP packet into smaller frames at the radio link layer and perform a limited number of retransmissions over the air link to try to recover from frame errors. If a frame cannot be transmitted successfully by RLP, it is up to the higher layer TCP to retransmit. In GPRS, if RLC fails to transmit a frame, error-recovery is performed by the higher layers—Logical Link Control (LLC) and/or TCP. will invoke congestion control which may even reduce the window size to a single packet. The IS-707 RLP performs well in a random or flat Rayleigh-fading environment (i.e., a radio impairment encountered in cellular telephones 800 MHz frequency band that causes an occasional signal interval to be lost) and TCP throughput is maintained at near maximum until an average air link frame error rate of fifteen percent (15%) occurs.

The problem becomes worse for wireless links with prolonged fading/shadowing in a typical urban or metropolitan environment. Disconnections of the order of a few seconds are common when the user moves out of coverage or under a bridge or tunnel. This can make the RLP retransmission mechanism futile. In addition, cellular networks fall in the category commonly known as Long-Thin-Networks (LTN) which are characterized by a long round-trip delay. Traditional TCP throughput for LTN's is inversely related to the round-trip delay. The longer the TCP ACK packets takes to reach the source, the greater the lag between the packet loss and the loss recovery process and the worse the performance. Hence, it makes sense to retransmit TCP packets locally at the base station controller (BSC) close to the radio link.

Recent proposals for improving TCP performance can be divided into two broad classes: (i) those which do not maintain end-to-end TCP semantics, including Indirect TCP (I-TCP) and Mobile TCP/Server Request Programming (MTCP/SRP); and (ii) those which do, including link layer ARQ approach (Code Division Multiple Access (CDMA) RLP, GPRS RLC, and Airmail), and "Snoop" approach.

One of the earlier proposals for the class of approaches which do not maintain end-to-end TCP semantics is called I-TCP. It involves splitting each TCP connection at sender and receiver into two separate connections at the BSC—one over the radio link and the other between the BSC (known as Mobile Support Router (MSR)) and the end host. I-TCP attempts to shield the regular TCP packet from packet loss over wireless link. However, normal TCP activity over air link runs into severe problems. Also, the violation of the end-to-end TCP semantics may lead to buffer overflows at the MSR when wireless TCP timeouts arise due to link failures and the regular (wireline) TCP does not time out. Processing overhead is also very high as TCP processing takes place twice at MSR for each packet. Also, since the protocol maintains a significant amount of state information at the MSR per TCP connection, hand-off procedures tend to be complicated and lengthy.

Although a few other split TCP approaches (MTCP and SRP) have been suggested which propose to use a lightweight TCP connection over the air link, the main problems with this approach are the large processing overhead at the BSC and the complicated hand-off of TCP connection states from one BSC to another. Utilizing a lightweight TCP over the air-link also calls for a change in the commercial TCP stack running in the mobile host. The link layer ARQ schemes are generally sufficient under ordinary fading conditions. However, during prolonged deep fades or disconnections, these retransmissions are insufficient to control TCP's performance. Also, the link layer schemes are totally oblivious of the existence of TCP which can be detrimental to TCP's performance (e.g., TCP's retransmission timer may time-out while RLC is doing retransmissions, prompting unnecessary retransmission of the same data and severely affecting TCP throughput).

Over the recent years, a number of other smart schemes have been developed to guarantee consistent TCP performance over radio link. Notable among the class which preserves end-to-end TCP semantics is the "snoop" approach (Snoop) for data transmission in the forward link. This scheme introduces a module above the IP layer at the Base Station Controller (BSC) whose main function is to cache TCP packets for future retransmission and discard duplicate ACK's to prevent the remote TCP sender from entering the congestion control mode. Snoop improves performance due to the local priority-based retransmissions allowing faster error recovery. However, some significant drawbacks exist with the snoop approach. Snoop retransmits the entire TCP packet. Snoop also does not provide any means to induce TCP flow control during the onset of a prolonged disconnection (e.g., when an user enters a tunnel or loses coverage for a few seconds).

A significant robustness of performance for the TCP layer can be achieved by using a feedback mechanism between the link layer ARQ and the transport layer, tightly coupling the activities of both layers in the process. This is absent in current standards (e.g., GPRS, where LLC and RLC transmissions are totally TCP-unaware). The "snoop" approach performs somewhat better by reducing the round trip response to TCP packet losses, but also suffers from several drawbacks as noted earlier.

In light of the foregoing, it is desirable that there be a close coupling between the link layer retransmissions (RLP/RLC/LLC) and the TCP retransmission such that their functions are not duplicated. It would also therefore be generally beneficial and desirable to have a quicker methods which recovers only the portions of a packet which are actually lost (e.g., an air link frame), rather than the larger TCP packets. It would further be desirable to have a system which is capable of responding to short term fadings and long/prolonged disconnects during TCP connections.

SUMMARY OF THE INVENTION

It is therefore one object of the present invention to provide an improved electronic communications system.

It is another object of the present invention to provide a method and system for implementing control mechanisms to enhance electronic communications system performance.

It is yet another object of the present invention to provide a method and system for implementing robust TCP performance over wireless links utilizing a TCP-Aware Agent Sublayer (TAS).

The foregoing objects are achieved as is now described.

A system for minimizing the effects of faults over an air link of a wireless transmission channel utilizing Transport Control Protocol (TCP) is disclosed. The system includes means for caching both TCP packets during forward transmission and acknowledgment (ACK) return packets. The caching means is located near a wireless link of the wireless transmission channel. The system also includes means, associated with the caching means, for monitoring a condition of the wireless transmission channel for an occurrence of a predefined fault. Once a predefined fault is detected, the system has means for responding to the occurrence of the fault wherein, when the fault is an air link packet loss, an associated packet is immediately retransmitted from the cache, and where the fault is a temporary disconnect, a congestion window of a TCP source is closed. In the preferred embodiment, the caching means is implemented by a TCPA-ware Agent Sublayer (TAS) in a protocol stack, and the monitoring means is implemented by a link monitoring agent coupled to said TAS.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1A:
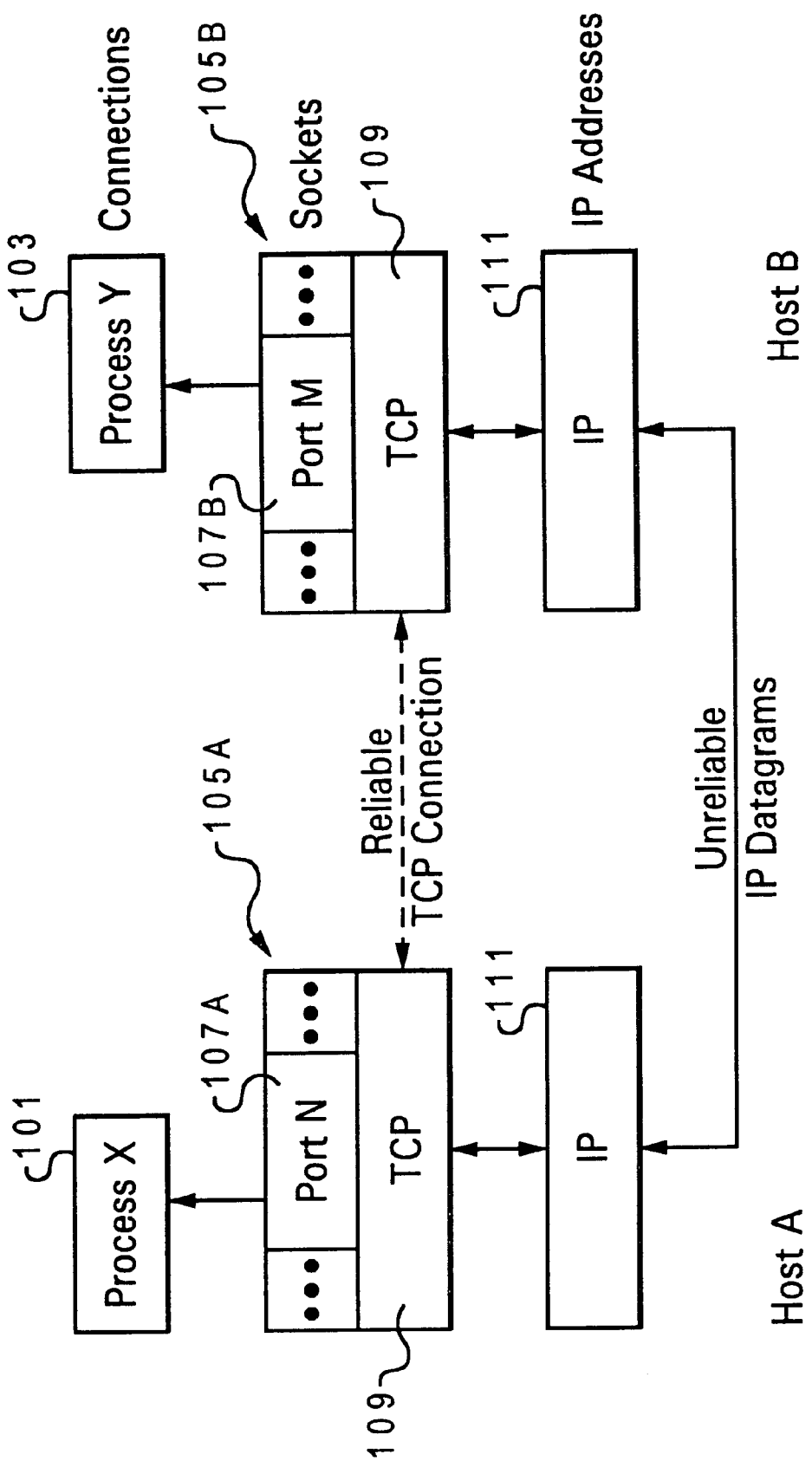
FIG. 1A depicts a host-to-host connection utilizing transport control protocol (TCP) in accordance with the preferred embodiment of the invention.

The present invention implements a scheme to enhance TCP performance for various kinds of radio link conditions, including short term fadings as well as prolonged disconnection during loss of coverage or hard hand-offs. The invention is implemented as a TCP-aware Agent Sub-layer (TAS) which extends the caching and retransmission mechanism proposed by the Snoop protocol by incorporating new mechanisms such as TCP ACK delay and source TCP window quench. In the preferred embodiment, TAS is transparent to any generation (2.5 G or 3 G) wireless data standards for cellular networks. Code Division Multiple Access (CDMA) standard air interface is utilized. TAS when implemented exhibits a significant increase in the robustness of TCP performance under various air-link failure conditions.

A CDMA physical layer following the Internet Standard (IS)-95 standards is utilized in one embodiment with a bit rate of 57.6 Kbps. The main blocks of the physical layer includes a convolutional encoder and Viterbi decoder, and orthogonal (Walsh code) modulator/demodulator. Fast, closed loop power control is implemented as specified in IS-95. The power control bit is set to '0' if the received Signal-to-Noise level Eb/No is less than a threshold, otherwise it is set to '1'. (A power control bit '0' increases power at the transmitter by 1 dB (nominal) while '1' reduces the power by the same amount.) However, the change in mean output power level per 10 valid power control bits of the same sign shall be within 20% of 10 times the nominal change. Those skilled in the art are familiar with CDMA and its various functionalities and configurations.

In the preferred and illustrative embodiments, the channel is assumed to be flat Rayleigh-faded with the Doppler frequency depending upon the speed of the mobile and carrier frequency. Doppler frequency is given by, "$f==v*f_c/c$", where $f_c$ is the carrier frequency, v the speed of the mobile and 'c' the speed of light.

The invention is described with reference to the Radio Link Protocol (RLP) as specified in IS-707. RLP is a pure NAK based protocol, which means that the receiver informs the transmitter only about those frames it has not received correctly. Whenever the RLP layer at the receiver receives a correct new RLP frame (Data or Idle), it sends NAKs to the source for all the incorrectly received data frames for which NAKs have not yet been sent until that frame. Timers (implemented as counters) are also set for such frames. For each correctly received NAK at the source, the requested RLP frames are retransmitted by the source. If a frame for which NAK was sent is not received correctly before the first timer expires, RLP resets the timer and sends two NAKs for the same frame. If the frame is not received correctly before the second timer expires, RLP sends three NAKs for the same frame and resets the timer. This continues until N attempts have been made after which the trials are aborted. In such a case, the corresponding TCP segment will be recovered at the TCP layer.

The implementation is based on the snoop protocol (snoop) with various novel and significant modifications. Snoop, in present form does not support source window quenching and does not allow RLP mechanisms to exist in link layer. Whenever a notification about disconnection is received from the Link Monitoring Agent, the TAS agent scans its cache to see whether the TCP packet corresponding to the Quench-Ack is present in the cache. If so, it fabricates a Quench-Ack and sends it back to the source. The Link Monitoring Agent closely monitors the RLP activity. Utilizing an algorithm described below, the Link Monitoring Agent predicts the disconnection of the forward channel. If a Quench-Ack needs to be sent, it notifies the TAS agent. This is done because there can be scenarios in which no data transfer is taking place during the disconnection. In such a case no Quench-Ack needs to be sent.

The RLP itself stores the TCP segment as RLP frames to reduce the redundant caching of TCP segments at base station. For the data transfer in forward direction, the next hop from the Snoop is the destination itself, thus simplifying the round trip timer timeout (RTO) computations. Because of the above modifications, TAS provides substantial improvements over the Snoop during temporary disconnection due to addition of the source quenching mechanism and performs comparable to Snoop in other scenarios.

Figure 1B:
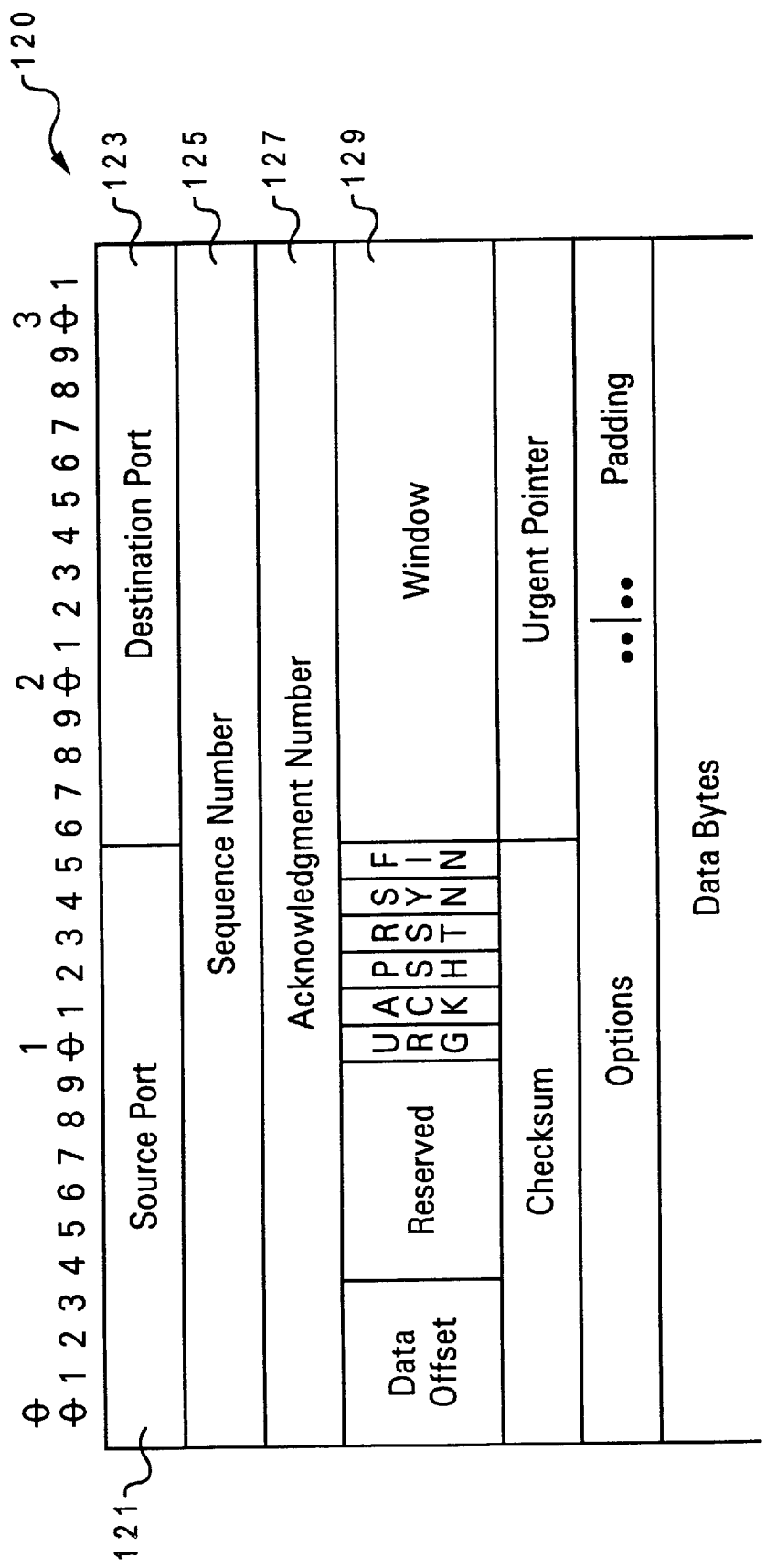
FIG. 1B depicts the various segments of a transport control protocol (TCP) utilized within the preferred embodiment of the invention.

With reference now to the figures and in particular with reference to FIG. 1, there is depicted a TCP host-to-host connection. The TCP connection connects host A 101 to host B 103. Each host has IP datagrams 105A and 105B which include (socket) port addresses 107A and 107B. Each IP datagram 105A and 105B has a TCP header 109 utilized to route IP datagrams 105A and 105B over an IP network. IP datagram 105 also has connection IP layer Turning now to FIG. 1B, there is depicted a TCP segment 120 according to the present invention. In this particular embodiment, the TCP header includes a source port (address) 121 and a destination port (address) 123. TCP segment 120 also includes a sequence number 125, acknowledgment number 127, and window 129. The present invention is primarily concerned with TCP data packets and ACK packets. During implementation, these segments are monitored and manipulated.

The invention implements a robust TCP performance over various types of radio-link failures (fast fading, long disconnection etc.). Several of the major functions and advantages of the invention include:

1) Minimizing the chance of the TCP sender entering the congestion control mode, even under most adverse conditions.
2) Utilizing link layer ARQ mechanisms as defined in various generations (3 G/2.5 G) standards to recover from air link losses.
3) Utilizing the caching and retransmission mechanisms similar to Snoop when RLP fails. This mechanism is only utilized when some performance benefit is expected.
4) Providing an efficient feedback mechanism from the radio link layer to the transport utilizing a function (referred to herein as wireless Link Monitoring Agent) for tighter coupling between the two.
5) Quenching the TCP source window if a long disconnection is predicted. Close monitoring of the radio link is required to predict the onset of such disconnection and is also the function of the Link Monitoring Agent.
6) Implementing the above functionalities completely transparent to the 3 G/2.5 G standards without requiring any changes in the commercial TCP/IP stack sitting on the mobile or the remote hosts.

Figure 2:
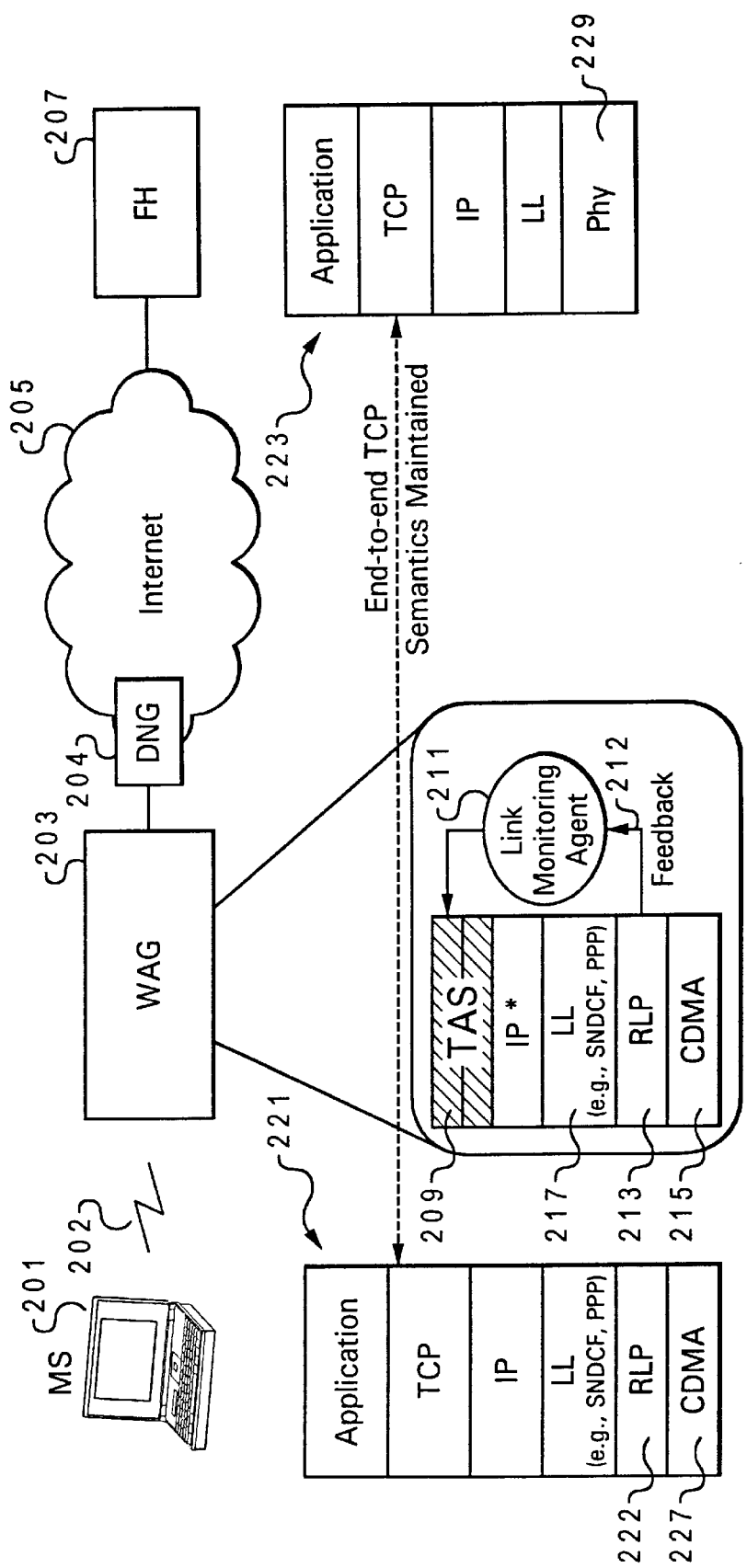
FIG. 2 depicts the TCP of FIG. 1 with TCP-aware Agent Sublayer(TAS) in a transmission subsystem having a QoS agent according to the preferred embodiment of the present invention.

The invention allows the co-existence of TAS and RLP, along with a feedback mechanism between the two layers through a wireless Link Monitoring Agent, as illustrated in FIG. 2. FIG. 2 depicts a mobile station (MS) 201 with a connection 202 to Wireless Access Gateway (WAG) 203. WAG 203 is equivalent to a Base Station Controller/Mobile Station Controller (BSC/MSC) in the current CDMA architecture or Base Station Subsystem (BSS)/ Serving GPRS Support Node (SGSN) in GPRS architecture. WAG 203 is coupled to Data Network Gateway (DNG) 204 which serves as the gateway router to the Internet 205 (similar to Gateway GPRS Support Node (GGSN) in GPRS). Connected to the other side of Internet 205 is Fixed Host (FH) 207. MS 201 and a Fixed Host (FH) 207 both utilize a protocol stack (layers) 221 and 223 respectively in transmitting data via Internet 205. The lower layers on the forward path comprises of RLP 213 and CDMA 227 while the return path comprises of Physical Layer (Phy) 229. The RLP retransmission mechanism is assumed to be the same as utilized in current IS-707 standard or likely to be used in CDMA2000 Phase I. WAG 203 contains the various components utilized within the invention. These include TAS 209 and RLP 213 with a feedback loop 212 running from RLP 213 back to TAS 209. feedback loop 212 contains wireless Link Monitoring Agent 211. WAG 203 also contains IP layer 225, Link Layer (LL) 226 and CDMA 227. IN the preferred embodiment, IP layer 225 is modified to send packets to TAS (rather than directly to router port) where packet is cached, packet information is obtained and manipulated if necessary before the packet is forwarded to the destination port (FH).

The functionality of the wireless Link Monitoring Agent is integrated with that of TAS, and is discussed with the functionality of TAS below. The main functionalities of TAS include:

1. Caching and re-transmitting TCP packets;
2. Monitoring and manipulating delayed ACK; and
3. Quenching (or adjusting) the TCP source window to combat prolonged disconnection.

The invention's first major function is the caching and re-transmitting of TCP packets. When TAS is turned on, it caches TCP data packets for local retransmissions in case of error. Typically, a TCP packet is split into several RLP frames. A TAS retransmission can then be prompted by either of the following two events:

1. A feedback from the Link Monitoring Agent, which can determine (by close monitoring of the RLP (re)transmission mechanism) which TCP packet is affected. This assumes that radio link ARQ mechanism can provide the Link Monitoring Agent with the sequence number of the frame which it failed to deliver after a pre-specified number of retransmission attempts. The Link Monitoring Agent keeps track of the sequence number of the first RLP frame corresponding to each TCP packet as they flow down from the higher layer. This information is stored in the form of tupples (i.e. <TCP seq number, first RLP frame seq #>) in the Link Monitoring Agent memory. When such a frame loss is signaled, the Link Monitoring Agent computes the sequence # of the TCP packet containing this lost frame and instructs TAS to re-transmit the entire TCP packet. At the same time, the Link Monitoring Agent signals a buffer management entity residing within the RLP layer to discard the remaining frames corresponding to the corrupted TCP packet. This implementation prevents unnecessary retransmission of the remaining RLP frames corresponding to the corrupted TCP packet over the air link (TAS will retransmit the TCP packet anyway). Also, it significantly reduces the feedback time from the point a TCP packet is corrupted to the point TAS is informed about this, so that the recovery time can be minimized. In this implementation, some enhancement of the existing RLP is required to reduce the associated processing overhead.

2. On receipt of the first duplicate ACK or expiration of retransmission timer. This preferred embodiment takes the basic functionality utilized by snoop and makes several major enhancements described herein. Also, this implementation requires little involvement on the part of the wireless Link Monitoring Agent and no enhancement of RLP. TAS caches the ACK packets as they arrive from the TCP receiver (the mobile station in this example). Unlike the TCP receiver which retransmits only after receiving three duplicate ACK's in order to account for unordered delivery, TAS can retransmit immediately after receiving the first duplicate ACK since unordered delivery is not possible over the last hop. This implementation is much faster than TCP's "fast" retransmission but slower than the implementation above. TAS also intercepts and discards any duplicate ACK packet (notably, the third duplicate ACK) bearing the octet sequence number of the packet which it has retransmitted, to prevent them from reaching the TCP source. This prevents the source from entering the congestion control mode.

This caching of packets at TAS entails some change in the IP layer software at the WAG. The network (IP) layer, after receiving an IP packet (with TCP data or ACK packet as payload), sends it to the TAS sub-layer for caching, before routing it to the router port. The caching and local retransmission capability requires some amount of processing overhead on the part of the software. Hence, a mechanism is included by which this caching and retransmission will be turned OFF when it is expected not to produce significant benefit. Local retransmission of TCP packet produce significant benefits when the round-trip delay (RTD) between the TCP source and destination is large (such as, >0.5 seconds). The algorithm (mechanism) therefore measures the RTD and compares it to a predetermined value to decide when to turn the TAS module ON/OFF during actual data communication.

Standard TCP implementations maintain a running estimate of the round-trip delay, RTD (time from the transmission of a TCP packet to receiving the first ACK acknowledging the receipt of the octet sequences of this packet), to set its round trip timer timeout (RTO) duration. TCP uses a smoothed average estimator augmented by a smoothed mean-deviation estimate to compute the RTO. The timer granularity of the round-trip timer (RTT) in most implementations is 500 ms.

Generally, the TCP RTO estimation is highly over engineered. Those skilled in the art are aware of the over-engineering of TCP RTO. The amount of over-engineering assumes a constant value over time (the initial (transient) difference between RTO and the measured RTD depends on the initialization which may vary from implementation to implementation, but due to the smoothed nature of the estimate, the amount of over-engineering—difference between measured RTD and the estimated RTO—assumes a moderately uniform value over time). This over-engineering is to the advantage of the (error-prone) wireless link, but only in case of random or short error bursts.

A single RLP frame retransmission incurs at least 80 ms delay in the current CDMA system. This includes the time to send a NAK and retransmit a duplicate copy of the original frame. Each of these transmissions may take up to 40 ms (frame delay=20 ms+queuing & radio channel element delays of 20 ms).

Under the following set of assumptions, the mean and the standard deviations of a TCP packet transmission delay over a 9.6 Kbps radio channel are computed as 1240 ms and 43 ms. The small standard deviation to mean ratio in the case of random frame error coupled with the over-engineering of the TCP RTO timer estimate makes sure that the TCP timer almost never timeouts.

During a prolonged deep fade lasting for a few seconds, however, the RTO will almost definitely time-out in spite of this over-engineering, as it takes at least one round-trip time to adjust the timer to the new delay variation caused by local retransmission attempts by RLP and then by TAS. (This is quite common in metropolitan areas due to coverage losses, shadowing by buildings/bridges/tunnel etc.). A possible way to prevent this is to predict the onset of this disconnection or lack of radio link bandwidth, and increase the RTD by delaying the current ACK packets by a certain amount. In the present invention, this prediction is completed by the wireless Link Monitoring Agent and the intercepted ACK packets are delayed at TAS. Even under severe fluctuations of the round trip delay, an increase in the RTD by about 1 sec is generally sufficient to increase the RTO by one more tick (500 ms for BSD implementation). However, even in the absence of any large fluctuation, an increase in the RTD leads to a similar increase in the RTO estimation. This is due to the high emphasis given to the delay deviation in the RTO estimation algorithm.

Under little or no fluctuation, a sudden increase in the RTD will lead to a corresponding increase in the RTO estimate. Thus, it makes sense to attempt to delay ACK at the onset of a disconnection with the hope that it will make the TCP source re-compute its RTO. This delay, however, is kept less than 500 ms in the preferred embodiment in order to prevent an actual timeout during the current measurement cycle.

CHANNEL STATE ESTIMATION ALGORITHM

The wireless Link Monitoring Agent has to predict the onset of a disconnection. This prediction utilizes a channel state estimation algorithm. In one embodiment, an imminent disconnection is predicted by monitoring when the number of errored air-link frames in a set of consecutive frames reaches a pre-defined implementation-dependent threshold. The wireless Link Monitoring Agent closely monitors the air-link frame error rate (FER). The frame error information for the transmitted frames can be obtained in the current CDMA system from two sources:

1. RLP NAK and data frames from the opposite direction (definitive)
2. Series of power control bits in reverse link power control loop can also provide a good estimate of channel conditions and hence, the frame error (predictive)

Events which occur on the forward and reverse link (channel) are closely interrelated in nature and continuous observation of one channel gives useful information about the other. For example, a NAK packet is expected on the reverse channel only after a correct packet is received after one or more bad data packets on the forward channel. This interrelation is utilized to effectively predict the status (whether disconnected or not) of the forward link from the sequence of packets received at the source. It can be safely predicted that the forward channel is disconnected if (i) Sending RLP receives no packets, or (ii) Sending RLP receives only idle packets.

The duration of observation plays an important part in prediction. There is a trade off between the accuracy of prediction and the delay in prediction. The duration of observation is defined in terms of number of RLP frames (N). To get a fairly accurate prediction, the value of N should be $\{\geq >(2*TCP$ window in terms of MSS*Number of RLP frames per TCP MSS)$\}$. The above prediction algorithm assumes the presence of IS-707 RLP at the link layer and is a separate prediction scheme for prediction channel conditions.

When the Link Monitoring Agent predicts a disconnection (for example, after detecting a certain number of successive NAK frames), it signals TAS to start delaying all ACK packets. The RTO estimation algorithm (running at the remote host) only involves selected ACK's and does not involve the duplicate ACK's. Further, the RTO estimation is generally performed at least once in each window. Due to the lack of knowledge at TAS as to which of the ACK's is involved in the RTO estimation, all ACK's starting from the current one is delayed until the Link Monitoring Agent again signals acceptable link conditions.

The ACK-delay implementation is effective when the delayed ACK's are actually being used by the TCP source for the current RTO estimation. In another embodiment which prevents the TCP source from entering the congestion control mode, the TCP transmit window is quenched to zero utilizing the window advertisement field in the ACK message. This technique is described below.

Request for Comments (RFC's) 893/1122 specifies that TCP will go into persist mode of operation when a new (not duplicate) ACK packet is received by the source with the WINDOW field of the header set to zero. This field is actually set by the receiver TCP according to its available buffer space, but TAS can rewrite this field with a new value (e.g., 0) when it foresees imminent disconnection. Thus, the TCP source is fooled into believing that the receiver has run out of buffer when the actual reason is the radio link disconnection. Again, the wireless Link Monitoring Agent (based on its estimation of link condition) signals TAS to overwrite the window advertisement field in a new ACK packet (in its cache) with a value of zero, and send it out towards the source. At the same time, it also signals TAS to stop delaying ACK's, since, with the TCP source window reduced to zero, attempting to increase the RTO duration is not necessary.

In the persist mode of operation, the TCP source will keep on sending probe packets at regular, exponentially-increasing intervals utilizing a persist timer. These probe packets will be acknowledged and then discarded by TAS. Thus TAS is preventing the probe packets from attempting to reach the receiver which is probably still disconnected and is not aware of the TCP source being forced to enter the persist mode. When the Link Monitoring Agent again signals acceptable link conditions, TAS immediately (without waiting for the next probe) sends an ACK packet to the source advertising the original window size (window size at the beginning of the disconnection), which it stores in its memory. This enables the TCP source to start transmitting again at full blast without going through the slow start-congestion avoidance phase. Those skilled in the art are familiar with the "slow start" of transmission during congestion avoidance phase.

RFC 1122 recommends that a source should be prevented from entering a persist mode of operation based on the window advertisement in an old or duplicate ACK. If TAS does not find a new ACK packet in its cache when the Link Monitoring Agent signals a disconnection, TAS fabricates a new ACK packet corresponding to the current TCP packet (which is pursuing its tedious journey over the disconnected air link) and sends it towards the receiver with a window advertisement of zero. In the preferred embodiment, this is done in the following manner.

TAS stores the last ACK sent to the source. Whenever it needs to send an ACK with window size 0 (zero, referred to herein as a Quench-Ack), it will check whether the corresponding TCP segment is in the snoop cache. If it is there, TAS will replace appropriate fields in the stored ACK and send it to the source. Thus the remote TCP transmitter will have the (wrong) impression that this packet has been successfully retransmitted and will update its state accordingly. However, since the advertised window size is zero, it will also enter the persist mode. TAS now assumes the responsibility for transmitting the packet over the air link (once link condition has improved) and bring the receiver to the same state as the transmitter. When the link has returned to its normal state, TAS may get one or more ACKs which have the same Ack Number as the Quench-Ack. TAS discards the first of such ACKs since it was already sent to the source (even before its reception by TAS) as the Quench-Ack. All the other ACKs with the same Ack Number and new ACKs (having Ack Number greater that Quench-Ack) will be passed on to the TCP source.

Figure 3:
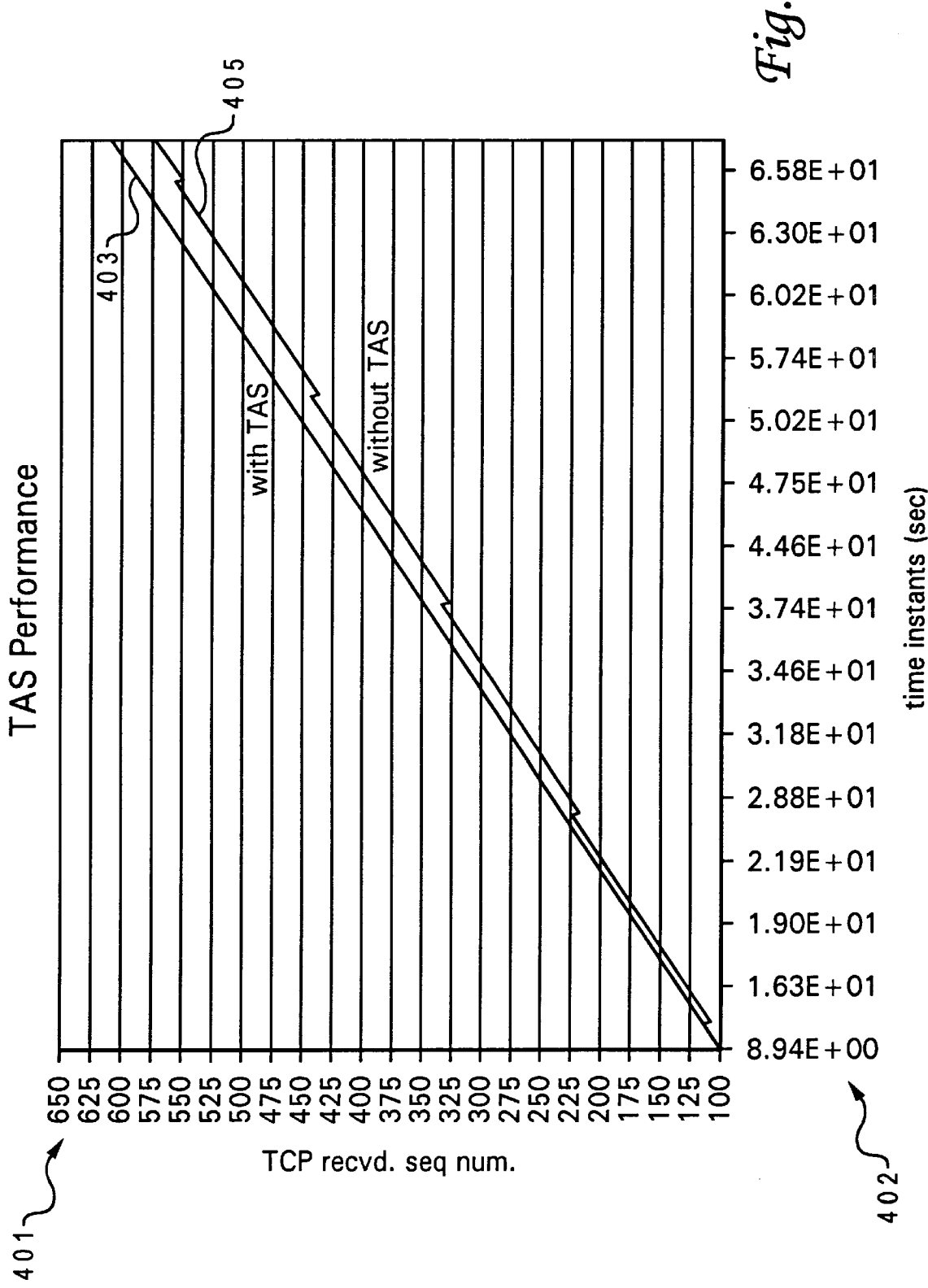
FIG. 3 depicts a graph of the system response with and without TAS in accordance with one implementation of the present invention.

FIG. 3 depicts a graph of the system operating with and without TAS. TCP received sequence numbers 401 are plotted on the X axis against time 402 measured in seconds plotted on the Y axis. Two curves are plotted to represent system response with TAS 403 and system response without TAS 405. As can be seen from the curves, system response with TAS 403 is more predictable and better than system response without TAS 405.

Various methods of manipulating the system characteristics may be implemented. In some instances the system characteristics perform better when TAS is turned off. In most manipulation, however, the system exhibits substantial improvement in operation with TAS than without TAS. In the preferred embodiment, and algorithm is built in to determine system conditions and prompt TAS to turn "on" or "off." For example, when the airlink frame error rate (FER) is low (i.e Airlink FER=5%), almost every TCP segment is successfully transmitted due to the RLP retransmission mechanism which works well at this FER. Caching at base station transceiver (BTS) does not improve performance much and the caching mechanism of TAS can be turned off.

In another example, when the Airlink FER is relatively high (i.e. 15%.), some of the TCP packets get lost during their travel on the wireless link in spite of the retransmission mechanism of RLP. With TCP Packet caching implemented, these losses can be recovered locally without the TCP host being aware of the loss. Without caching at BTS, fast retransmit is done by the TCP because of which TCP window is reduced and the slope decreases whereas caching leaves the performance unaffected. Caching mechanism of TAS should thus be turned on.

In a final implementation involving time, the system has a bad state duration and a good state duration. In good state, Airlink FER is around 5%. When the forward channel is in good state for a large period of time (relative to the time in bad state), the quenching mechanism avoids TCP timeout. When working with high bit rates avoiding TCP timeouts/fast retransmissions would improve the performance significantly because quenching in effect avoids window contraction. Thus TAS mechanism should be turned on.

Due to source quench mechanism, TAS avoids timeouts of the TCP source. Thus the performance of TCP is improved. This is especially significant at high bit rates as it avoids TCP window contraction. The duration of observation needs to be determined by Link Monitoring Agent and may be required to be changed due to variations in different estimated parameters of the channel.

While the invention has been particularly shown and described with reference to a preferred embodiment, it will be understood by those skilled in the art that various changes in form and detail may be made therein without departing from the spirit and scope of the invention.

What is claimed is:

1. A system for minimizing the effects of faults over an air link of a wireless transmission channel utilizing Transport Control Protocol (TCP), said system comprising:
    a TCP-Aware Agent Sublayer (TAS) in a protocol stack, said TAS including a caching mechanism coupled to a wireless link of said wireless transmission channel for caching TCP packets during forward transmission and acknowledgment (ACK) of return packets, wherein said caching mechanism includes means for routing a packet from an Internet Protocol (IP) sublayer to said TAS during forward transmission;
    means, associated with said caching mechanism, for monitoring a condition of said wireless transmission channel for an occurrence of a predefined fault; and
    means for responding to said occurrence wherein, when said fault is an air link packet loss, an associated packet is immediately retransmitted from said cache, and when said fault is a temporary disconnect, a congestion window of a TCP source is closed.

2. The system of claim 1, wherein said monitoring means is implemented by a link monitoring agent coupled to said TAS, which predicts when a disconnection occurs, said monitoring means further includes means for checking a frame error rate (FER) and a radio link protocol (RLP) negative acknowledgment (NAK).

3. The system of claim 2, further comprising:
    means for determining when a number of errored air link frames in a set of consecutive frames reaches a pre-defined threshold;
    means for predicting a disconnect in a forward channel; and
    means for signaling said TAS to begin delaying ACK packets.

4. The system of claim 2, further comprising:
    means for predicting an onset of a disconnection or a lack of radio bandwidth utilizing said link monitoring agent; and
    means for increasing a round trip delay of current ACK packets by delaying said ACK packets by a predetermined amount at said TAS.

5. The system of claim 1, wherein said responding means further includes:
    means for resetting a window field in an ACK packet to a value which signals congestion at a destination; and
    means for sending said ACK packet to said TCP source to induce said TCP source to stop transmitting.

6. The system of claim 5, wherein said resetting means further includes:
    means for storing an original value of said window field, contemporaneously with said setting means;
    means for restoring said original value when said disconnection is over; and
    means for sending said ACK packet having said original value in said window field to said TCP source, said means prompting said TCP source to resume transmitting packets from a point at which it stopped transmitting packets.

7. The system of claim 5, wherein said resetting means includes:
    means for modifying a previous ACK packet to resemble said new ACK packet when no new ACK packet is received from the transmission channel;
    means for resetting said window field in said modified previous ACK packet.

8. The system of claim 1, said responding means including means for retransmitting a TCP packet when a retransmission timer expires.

9. A method for minimizing the effects of faults over an air link of a wireless transmission channel utilizing Transport Control Protocol (TCP), said method comprising the steps of:
    caching TCP packets during forward transmission and acknowledgment (ACK) of return packets utilizing a TCP-Aware Agent Sublayer (TAS) in a protocol stack coupled to a wireless link of said wireless transmission channel, wherein a packet is routed from an Internet Protocol (IP) sublayer to said TAS during forward transmission;
    monitoring a condition of said wireless transmission channel for an occurrence of a predefined fault; and
    responding to said occurrence by, when said fault is an air link packet loss, immediately retransmitting an associated packet from said cache and, when said fault is a temporary disconnect, shutting off a congestion window of a TCP source.

10. The method of claim 9, wherein said monitoring step is implemented by a link monitoring agent coupled to said TAS, which predicts when a disconnection occurs, said monitoring step further includes the steps of:
    determining a frame error rate (FER); and
    identifying a radio link protocol (RLP) negative acknowledgment (NAK).

11. The method of claim 10, further comprising the steps of:
    determining when a number of errored air link frames in a set of consecutive frames reaches a pre-defined threshold;
    predicting a disconnect in a forward channel; and
    signaling TAS to begin delaying ACK packets in response to said predicting step.

12. The method of claim 10, further comprising the steps of:
    predicting an onset of a disconnection or a lack of radio bandwidth utilizing said link monitoring agent; and
    increasing a round trip delay of current ACK packets by delaying said ACK packets by a predetermined amount at said TAS.

13. The method of claim 9, said responding step further includes the steps of:
    resetting a window field in an ACK packet to a value corresponding to a congestion at a destination; and sending said ACK packet to said TCP source to induce said TCP source to stop transmitting.

14. The method of claim 13, wherein said resetting step further includes the steps of:

storing an original value of said window field, contemporaneously with said setting step;

restoring said original value when said disconnection is over; and sending said ACK packet having said original value in said window field to said TCP source to prompt said TCP source to resume transmitting packets from the point at which it stopped transmitting packets.

15. The method of claim 13, wherein when no new ACK packet is received from the transmission channel, said resetting step includes the step of:

modifying a previous ACK packet to include characteristics of said new ACK packet; and resetting said window field in said modified previous ACK packet.

16. The method of claim 9, said responsive step including the step of retransmitting a TCP packet when a retransmission timer expires.

* * * * *

UNITED STATES PATENT AND TRADEMARK OFFICE
CERTIFICATE OF CORRECTION

PATENT NO.    : 6,208,620 B1
DATED         : March 27, 2001
INVENTOR(S)   : Sanjoy Sen et al.

It is certified that error appears in the above-identified patent and that said Letters Patent is hereby corrected as shown below:

<u>Title page,</u>
Item [74], please correct the word "Flesman" to -- Felsman --

Signed and Sealed this

Fifth Day of March, 2002

Attest:

JAMES E. ROGAN
*Attesting Officer*       *Director of the United States Patent and Trademark Office*